United States Patent [19]
McGuire

[11] Patent Number: 5,813,702
[45] Date of Patent: Sep. 29, 1998

[54] WATER SOFTENER DRAIN ADAPTOR SYSTEM

[76] Inventor: Harry William McGuire, 205 S. Smith St., Olds, Iowa 52647

[21] Appl. No.: 762,285

[22] Filed: Dec. 9, 1996

[51] Int. Cl.⁶ ........................................................ E03C 1/10
[52] U.S. Cl. ........................ 285/148.23; 137/216; 285/14; 285/924
[58] Field of Search ................................ 285/13, 14, 924, 285/148.23, 148.14, 159, 252, 8, 330, 42, 904; 137/216; 23/261

[56] References Cited

U.S. PATENT DOCUMENTS

| | | | |
|---|---|---|---|
| D. 374,067 | 9/1996 | Crook | D23/261 |
| 728,734 | 5/1903 | Lovely | 137/216 |
| 937,458 | 10/1909 | Mulherin | 285/8 X |
| 2,435,033 | 1/1948 | Campbell | 285/924 X |
| 3,158,169 | 11/1964 | Smith | 137/216 |
| 4,603,890 | 8/1986 | Huppee | 285/14 X |
| 4,619,471 | 10/1986 | Harbeke | 285/330 X |
| 4,758,027 | 7/1988 | Todd | 285/148.23 |
| 4,887,852 | 12/1989 | Hancock | 285/148.23 X |
| 4,905,766 | 3/1990 | Dietz et al. | 285/330 X |
| 5,222,334 | 6/1993 | Hasty | 285/42 X |

*Primary Examiner*—Eric K. Nicholson
*Assistant Examiner*—Greg Binda

[57] ABSTRACT

A water softener drain adapter system includes a tube having a first end and a lumen, a plurality of air slots project into the tube, an arcuate cap encloses an end of the tube opposite of the first end, and a tapered barb connector tube projects through the cap into the lumen. The tapered barb connector tube is for coupling to the drain hose of the water softener, and the first end of the tube engages the drain pipe within the sewage system. The plurality of air slots prevent sewage from being siphoned back into the water softener thereby preventing the water softener from being contaminated.

12 Claims, 3 Drawing Sheets

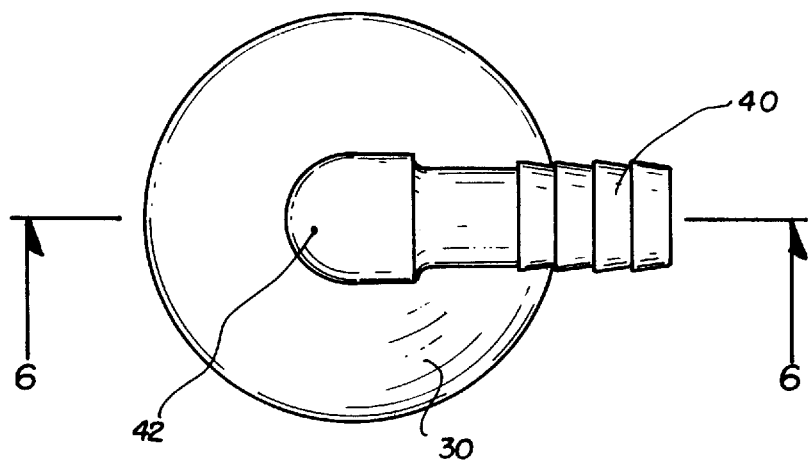
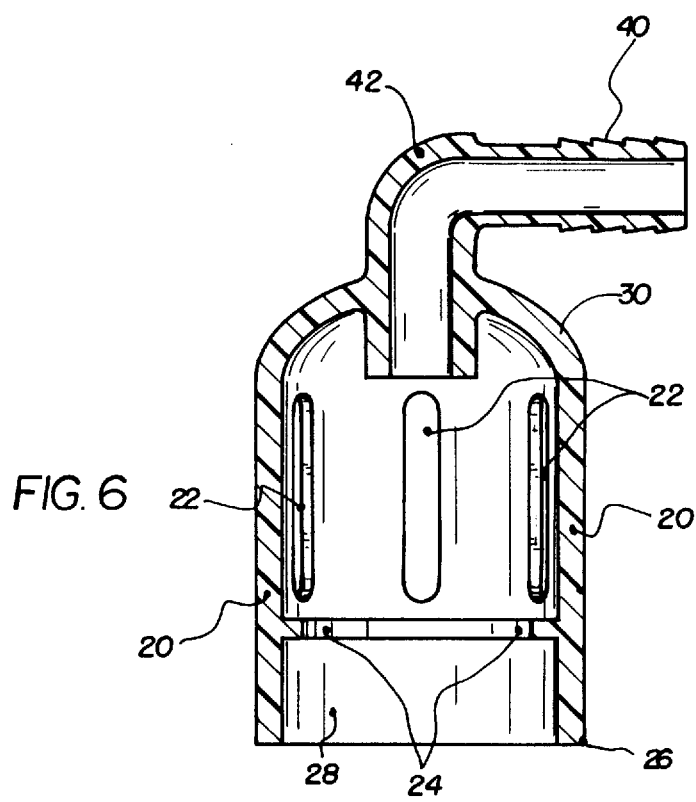

WATER SOFTENER DRAIN ADAPTOR SYSTEM

BACKGROUND OF THE INVENTION

1. Field of the Invention

The present invention relates to Drain Hose Devices and more particularly pertains to a new water softener drain adaptor system for providing a simple connector for a drain hose of a water softener for connecting to a drain pipe within a sewage system of a structure.

2. Description of the Prior Art

The use of drain hose devices is known in the prior art. More specifically, drain hose devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art drain hose devices include U.S. Pat. No. 5,312,138; U.S. Design Pat. No. 332,481; U.S. Design Pat. No. 311,573; U.S. Pat. No. 4,929,002; U.S. Pat. No. 5,354,106 and U.S. Pat. No. 4,109,939.

While these devices fulfill their respective, particular objectives and requirements, the aforementioned patents do not disclose a new water softener drain adaptor system. The inventive device includes a tube having a first end and a lumen, a plurality of air slots which project into the tube, an arcuate cap which encloses an end of the tube opposite of the first end, and a tapered barb connector tube which projects through the cap into the lumen.

In these respects, the water softener drain adaptor system according to the present invention substantially departs from the conventional concepts and designs of the prior art, and in so doing provides an apparatus primarily developed for the purpose of providing a simple connector for a drain hose of a water softener for connecting to a drain pipe within a sewage system of a structure.

SUMMARY OF THE INVENTION

In view of the foregoing disadvantages inherent in the known types of drain hose devices now present in the prior art, the present invention provides a new water softener drain adaptor system construction wherein the same can be utilized for providing a simple connector for a drain hose of a water softener for connecting to a drain pipe within a sewage system of a structure.

The general purpose of the present invention, which will be described subsequently in greater detail, is to provide a new water softener drain adaptor system apparatus and method which has many of the advantages of the drain hose devices mentioned heretofore and many novel features that result in a new water softener drain adaptor system which is not anticipated, rendered obvious, suggested, or even implied by any of the prior art drain hose devices, either alone or in any combination thereof.

To attain this, the present invention generally comprises a tube having a first end and a lumen, a plurality of air slots project into the tube, an arcuate cap encloses an end of the tube opposite of the first end, and a tapered barb connector tube projects through the cap into the lumen.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new water softener drain adaptor system apparatus and method which has many of the advantages of the drain hose devices mentioned heretofore and many novel features that result in a new water softener drain adaptor system which is not anticipated, rendered obvious, suggested, or even implied by any of the prior art, either alone or in any combination thereof.

It is another object of the present invention to provide a new water softener drain adaptor system which may be easily and efficiently manufactured and marketed.

It is a further object of the present invention to provide a new water softener drain adaptor system which is of a durable and reliable construction.

An even further object of the present invention is to provide a new water softener drain adaptor system which is susceptible of a low cost of manufacture with regard to both materials and labor, and which accordingly is then susceptible of low prices of sale to the consuming public, thereby making such water softener drain adaptor system economically available to the buying public.

Still yet another object of the present invention is to provide a new water softener drain adaptor system which provides in the apparatuses and methods of the prior art some of the advantages thereof, while simultaneously overcoming some of the disadvantages normally associated therewith.

Still another object of the present invention is to provide a new water softener drain adaptor system for providing a simple connector for a drain hose of a water softener for connecting to a drain pipe within a sewage system of a structure.

Yet another object of the present invention is to provide a new water softener drain adaptor system which includes a tube having a first end and a lumen, a plurality of air slots project into the tube, an arcuate cap encloses an end of the tube opposite of the first end, and a tapered barb connector tube projects through the cap into the lumen.

Still yet another object of the present invention is to provide a new water softener drain adaptor system that allows a user to easily connect a water softener drain hose to a drain pipe of a sewage system of a structure.

Even still another object of the present invention is to provide a new water softener drain adaptor system that saves time and money during the connection of a conventional water softener.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a top view of an alternative embodiment wherein the tapered barb connector tube includes an elbow.

FIG. 6 is a cross sectional view taken along line 6—6 of FIG. 5.

DESCRIPTION OF THE PREFERRED EMBODIMENT

Figure 1:
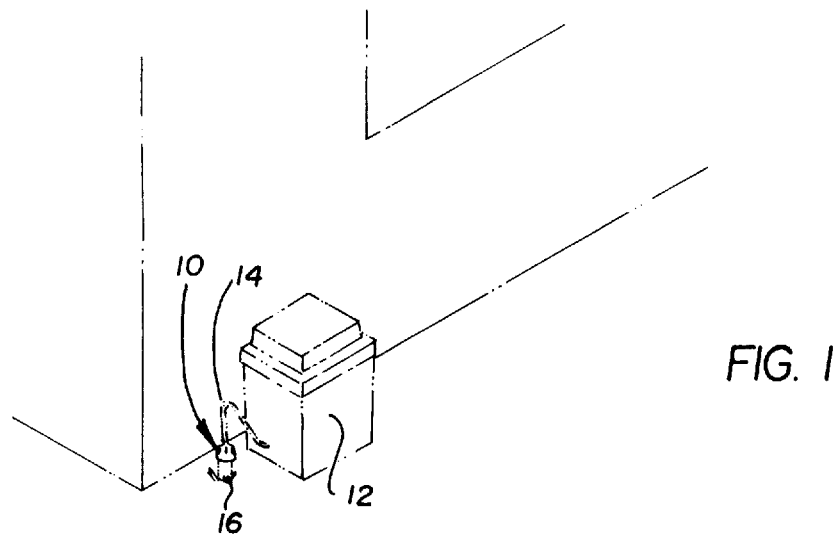
FIG. 1 is an upper perspective view of a new water softener drain adaptor system connected mesially to a drain hose and a drain pipe according to the present invention.

With reference now to the drawings, and in particular to FIGS. 1 through 6 thereof, a new water softener drain adaptor system embodying the principles and concepts of the present invention and generally designated by the reference numeral 10 will be described.

Figure 2:
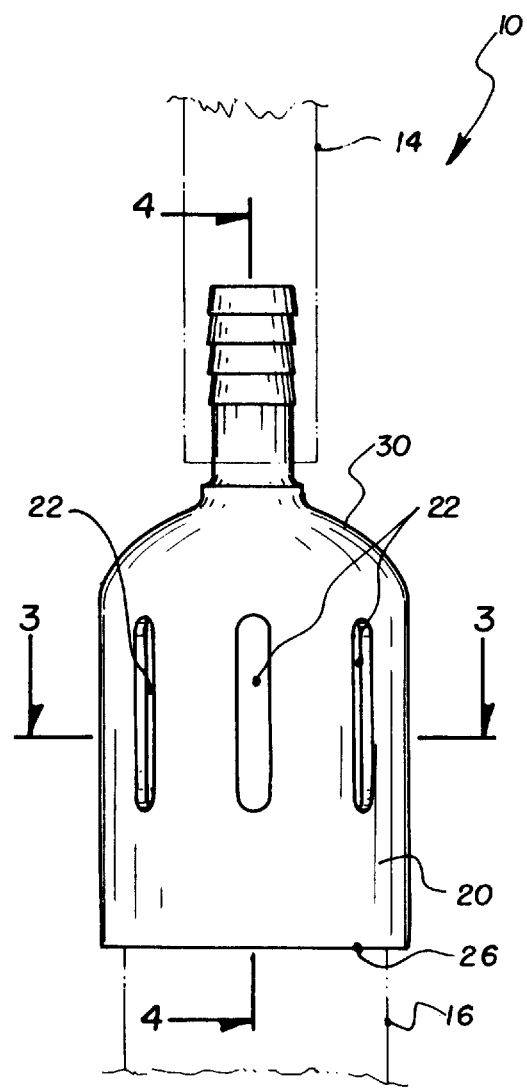
FIG. 2 is a side view of the present invention.
Figure 4:
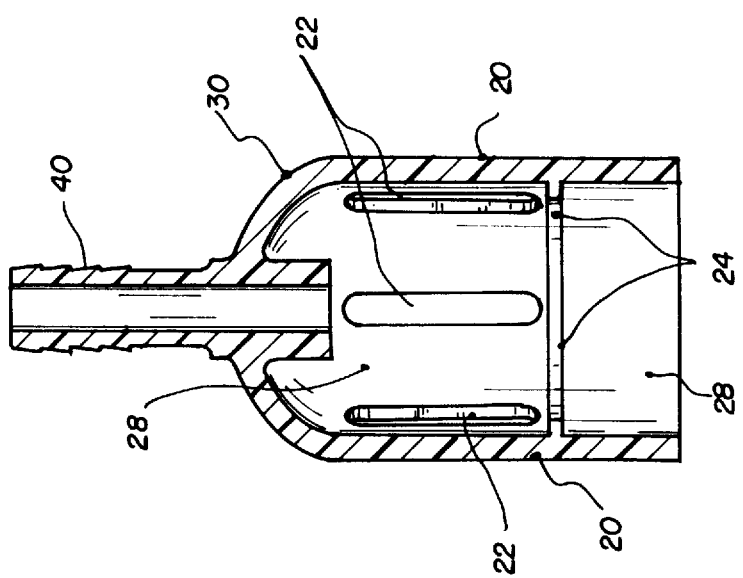
FIG. 4 is a cross sectional view taken along line 4—4 of FIG. 2.

More specifically, it will be noted that the Water Softener Drain Adaptor System 10 comprises a tube 20 having a first end 26, a lumen 28 and a longitudinal axis. The lumen 28 near the first end 26 has a diameter formed for snugly coupling to a drain pipe 16 of a conventional sewage system. A cap 30 is secured to the tube 20 opposite of the first end 26 as shown in FIGS. 2 and 4 of the drawings. The cap 30 is preferably dome shaped as shown in FIGS. 2 and 4 of the drawings. A tapered barb connector tube 40 is secured within the cap 30. The tapered barb connector tube 40 projects into the lumen 28 of the tube 20. The tapered barb connector tube 40 connects to a drain hose 14 of a water softener 12 as shown in FIG. 1 of the drawings. The tapered barb is preferably coaxial with the longitudinal axis. In an alternative embodiment as shown in FIGS. 5 and 6 of the drawings, an upper concentric portion of the tapered barb includes an elbow 42 for providing a various angles of connecting to the drain hose 14. The elbow 42 preferably has a 90 degree angle as best shown in FIG. 6 of the drawings. The tube 20 preferably has a diameter of 1½ inches. Preferably, the tapered barb connector tube 40 has a diameter of ½ inch. The tube 20 and cap 30 are preferably constructed from a polyvinlychoride (PVC) material.

Figure 3:
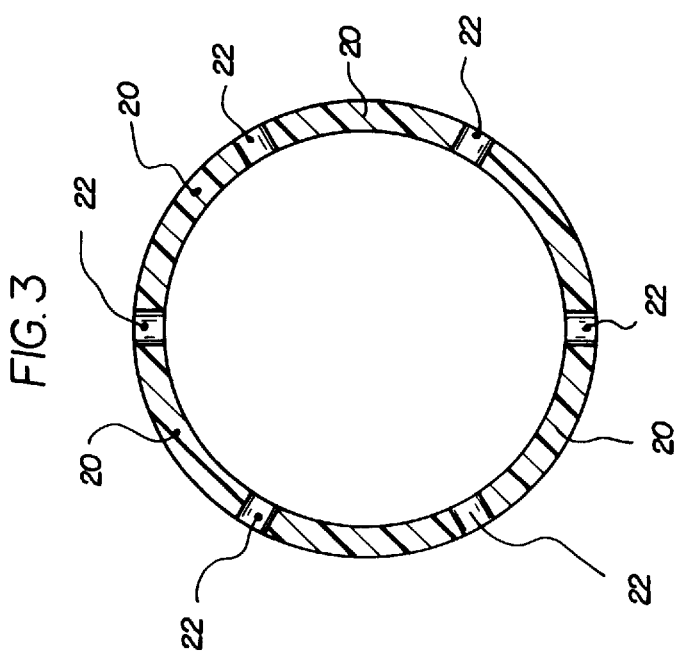
FIG. 3 is a cross sectional view taken along line 3—3 of FIG. 2.

As shown in FIGS. 2 through 4 of the drawings, a plurality of air slots 22 project into the tube 20 substantially parallel to the longitudinal axis for preventing sewage from the conventional sewage system from being siphoned back into the water softener 12. The air slots 22 preferably have a length of 1½ inches and a width of ¼ inches to provide maximum performance during operation of the present invention. A rib 24 is preferably secured within the lumen 28 to the tube 20 radially positioned with respect to the longitudinal axis and positioned a finite distance from the first end 26 and below the air slots 22 for preventing the drain pipe 16 from extending and covering the air slots 22 as shown in FIG. 4 of the drawings.

In use, the user positions the drain hose 14 from a water softener 12 onto the tapered barb connector tube 40. The user then applies a sealant to the end of the drain pipe 16 and secures the drain pipe 16 into the lumen 28 of the tube 20 until the drain pipe 16 engages the circular rib 24 thereby preventing the drain pipe 16 from covering the air slots 22. The waste water that flows from the water softener 12 through the drain hose 14 enters the tapered barb connector tube 40 where the waste water flows into the lumen 28 of the tube 20. The waste water thereafter flows into the drain pipe 16 of the conventional sewage system. The air slots 22 prevent siphoning of sewage from the conventional sewage system. The air slots 22 also provide an outlet port if the conventional sewage system should overflow thereby preventing sewage from being forced back into the water softener 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A water softener drain adapter comprising:
   a tube having a first end, a lumen and a longitudinal axis; said lumen near said first end having a diameter formed for snugly coupling over a drain pipe of a sewage system for preventing the collection of water and materials between said tube and said drain pipe;
   a cap secured to said tube opposite of said first end;
   a tapered barb connector tube secured within said cap, said tapered barb having a duct therethrough, said barb connector projecting into said lumen of said tube to permit fluid communication between said lumen and said duct, said barb connector being for connecting to a drain hose of a water softener, wherein said tapered barb is coaxial with said longitudinal axis;

a plurality of air slots projecting into said tube substantially parallel to said longitudinal axis for preventing sewage from said sewage system from being siphoned back into said water softener; and a rib secured within said lumen to said tube radially positioned with respect to said longitudinal axis and positioned a finite distance from said first end and below said air slots, said rib being for preventing said drain pipe from extending and covering said air slots.

2. The water softener drain adapter of claim 1, wherein said cap is dome shaped.

3. The water softener drain adapter of claim 1, wherein said air slots have a length of 1½ inches and a width of ¼ inches.

4. The water softener drain adapter of claim 1, wherein said tube has a diameter of 1½ inches and wherein said tapered barb connector tube has a diameter of ½ inch.

5. The water softener drain adapter of claim 4, wherein said tube and cap are constructed from a polyvinlychoride material.

6. A water softener drain adapter comprising:

a tube having a first end, a lumen and a longitudinal axis; said lumen near said first end having a diameter formed for snugly coupling over a drain pipe of a sewage system for preventing the collection of water and materials between said tube and said drain pipe;

a cap secured to said tube opposite of said first end;

a tapered barb connector tube secured within said cap, said tapered barb having a duct therethrough, said barb connector projecting into said lumen of said tube to permit fluid communication between said lumen and said duct, said barb connector being for connecting to a drain hose of a water softener, wherein a lower portion of said tapered barb is coaxial with said longitudinal axis and an upper concentric portion of said tapered barb includes an elbow for providing a various angles of connecting to said drain hose;

a plurality of elongate air slots projecting into said tube and oriented substantially parallel to said longitudinal axis for preventing sewage from said sewage system from being siphoned back into said water softener; and a rib secured within said lumen to said tube radially positioned with respect to said longitudinal axis and positioned a finite distance from said first end and below said air slots, said rib being for preventing said drain pipe from extending into said lumen a distance such that the drain pipe covers said air slots.

7. The water softener drain adapter of claim 6, wherein said elbow has a 90 degree angle.

8. The water softener drain adapter of claim 6, wherein said cap is dome shaped.

9. The water softener drain adapter of claim 6, wherein said air slots have a length of 1½ inches and a width of ¼ inches.

10. The water softener drain adapter of claim 6, wherein said tube has a diameter of 1½ inches and wherein said tapered barb connector tube has a diameter of ½ inch.

11. The water softener drain adapter of claim 6, wherein said tube and cap are constructed from a polyvinlychoride material.

12. A water softener adapter system comprising, in combination:

a water softener having a drain hose;

a drain pipe leading to a sewage system; and an adaptor, said adapter including a tube having a first end, a lumen and a longitudinal axis, said lumen near said first end for snugly coupling over the drain pipe for preventing the collection of water and materials between said tube and said drain pipe, a cap secured to said tube opposite of said first end, a tapered barb connector tube secured within said cap, said tapered barb having a duct therethrough, said barb connector projecting into said lumen of said tube to permit fluid communication between said lumen and said duct, said barb connector being for connecting to said drain hose of said water softener, wherein a lower portion of said tapered barb is coaxial with said longitudinal axis and an upper concentric portion of said tapered barb includes an elbow for providing a various angles of connecting to said drain hose, a plurality of elongate air slots projecting into said tube and oriented substantially parallel to said longitudinal axis for preventing sewage from said sewage system from being siphoned back into said water softener, wherein said cap is dome shaped, a rib secured within said lumen to said tube radially positioned with respect to said longitudinal axis and positioned a finite distance from said first end and below said air slots, said rib being for preventing said drain pipe from extending into said lumen a distance such that the drain pipe covers said air slots, wherein said air slots have a length of 1½ inches and a width of ¼ inches, wherein said tube has a diameter of 1½ inches and wherein said tapered barb connector tube has a diameter of ½ inch, and wherein said tube and cap are constructed from a polyvinlychoride material.

\* \* \* \* \*